J. H. McGLYNN.
EXPANSIBLE PULLEY.
APPLICATION FILED JAN. 6, 1912.
1,074,188.
Patented Sept. 30, 1913.
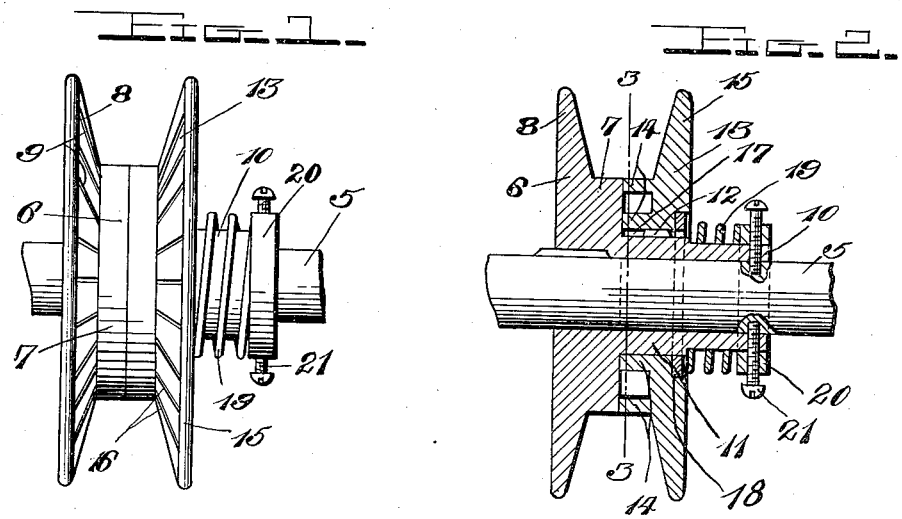
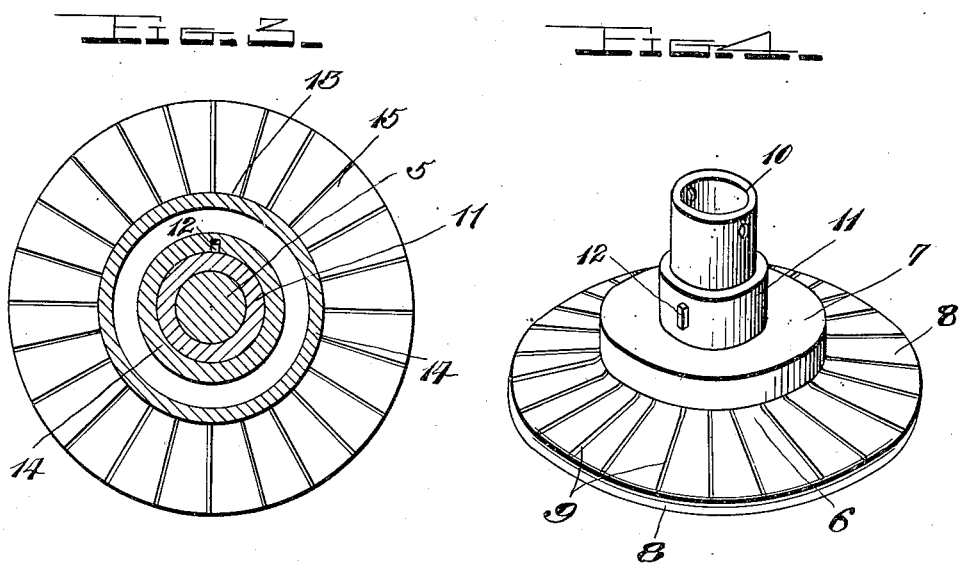
Witnesses
Chas. L. Griestauer.
A. B. Norton.
Inventor
James H. McGlynn,
By Watson E. Coleman
Attorney

UNITED STATES PATENT OFFICE.

JAMES H. McGLYNN, OF WILKES-BARRE, PENNSYLVANIA.

EXPANSIBLE PULLEY.

1,074,188. Specification of Letters Patent. Patented Sept. 30, 1913.

Application filed January 6, 1912. Serial No. 669,837.

*To all whom it may concern:*

Be it known that I, JAMES H. McGLYNN, a citizen of the United States, residing at Wilkes-Barre, in the county of Luzerne and State of Pennsylvania, have invented certain new and useful Improvements in Expansible Pulleys, of which the following is a specification, reference being had to the accompanying drawings.

This invention relates to expansible pulleys and has for its object to provide a simple, efficient and durable device of this character whereby a maximum amount of working power may be obtained from a minimum consumption of mechanical energy.

A further object of the invention resides in the provision of a pulley of the above character consisting of a rigid section and a yieldingly held movable section, the opposed faces of said pulley sections being corrugated for engagement with the edges of a belt whereby the same is prevented from slipping.

Still another object of the invention is to provide an expansible pulley with which a slack power transmitting belt may be used.

Still another object of the invention resides in the provision of an expansible pulley of the sectional type with which power transmission belts of various cross sectional forms may be used, said pulley adjusting itself to conform to the shape of the belt and securely gripping the same.

Another object of the invention is to provide an expansible pulley for power transmission belts whereby wear upon the shaft bearings is reduced to a minimum, said pulley being so constructed that its efficiency is not affected by accumulations of dust, oil or water upon the parts thereof.

With the above and other objects in view, the invention consists of the novel features of construction, combination and arrangement of parts hereinafter fully described and claimed, and illustrated in the accompanying drawings, in which—

Figure 1 is a side elevation of an expansible pulley embodying my improvements; Fig. 2 is a longitudinal section thereof; Fig. 3 is a section taken on the line 3—3 of Fig. 2; and Fig. 4 is a detail perspective view of the rigid pulley section.

Referring in detail to the drawing 5 designates a shaft upon which my improved expansible pulley is mounted and 6 indicates the rigid pulley section which is keyed or otherwise fixed upon said shaft. This pulley section 6 comprises a body 7 upon which the annular belt engaging rim or flange 8 is formed. The inner face of said rim is outwardly beveled or inclined and is provided with the spaced corrugations 9. A sleeve 10 is centrally formed upon the body of the pulley section, said sleeve and the body being bored to receive the shaft 5. The sleeve 10 adjacent its point of connection to the body of the pulley section is diametrically enlarged as indicated at 11 and has formed upon its periphery a key 12.

Upon the sleeve of the rigid pulley section, the loose section 13 is mounted for longitudinal sliding movement. The body of this loose pulley section is hollowed out for the sake of lightness and consists of the two concentric flanges 14, said body also having formed thereon a belt engaging rim or flange 15 the inner surface of which is outwardly beveled and extends in divergent relation to the beveled face of the fixed pulley section and is also provided with the spaced grooves or corrugations 16. The inner body flange 14 of the loose pulley section is provided with a key-way 17 to receive the key 12 upon the sleeve of the rigid pulley section 6. The outer face of the loose pulley section 13 is provided with an annular recess or depression to receive a washer 18 against which one end of a spiral spring 19 engages, said spring being loosely arranged upon the end portion of the sleeve 10 of the rigid pulley section. A collar 20 is rigidly secured upon the end of said sleeve by means of screws 21, and with this collar the other end of the spiral spring is engaged. The spring 19 normally acts to hold the loose or sliding pulley section in engagement with the body of the fixed section of the pulley.

When the drive belt is placed in position between the opposed corrugated faces of the pulley sections, it tends to force the loose pulley section longitudinally upon the sleeve 10 or toward the spiral spring 19. This spring acting to return the loose section of the pulley to its normal position forces the corrugated face thereof into close gripping engagement upon one edge of the belt, the other edge of the belt being similarly gripped by the opposed corrugated face of the rigid pulley section. Thus the belt is securely held upon the pulley against any possibility of its slipping in the movement of the same therearound.

In the driving of heavy machinery, proportionately wide and heavy transmission belts are used, and it will be readily seen that the increased width of the belt will create greater pressure or adhesion of the opposed faces of the pulley sections with the edges thereof. By providing the pulley sections with the frictional gripping faces for engagement with the belt, slack belts may be used as well as tight belts between the driving and driven shafts. The gripping engagement of the pulley sections with the edges of the belt will be the same at any point between the body of the pulley sections and the outer edges of the belt engaging rims thereof so that any desired speed of rotation may be transmitted to the shaft. It will also be obvious that by means of this sectional construction of the pulley, its durability is materially enhanced and undue strains thereon entirely avoided. Consequently wear upon the shaft bearings is also reduced to a minimum. As the slipping of the belt upon the flanges or rims of the pulley sections is entirely eliminated, the wear upon the belt is also materially reduced so that expense incident to the frequent renewal of the belting is dispensed with. The necessity for making constant repairs to the belt and applying a dressing thereto is also avoided. Owing to the few elements employed in the construction of my improved pulley, it will further be understood that the same will not be affected by oil or dust accumulating upon the parts thereof so that a maximum of durability is maintained. The device may also be constructed at comparatively small cost and is extremely efficient for the purpose in view.

It will be obvious that pulleys constructed in accordance with my invention may be manufactured in various sizes and that the device is also susceptible of various modifications in form and construction without departing from the essential feature or sacrificing any of the advantages thereof.

Having thus described the invention what is claimed is:—

In a device of the class described, the combination with a shaft having a pair of threaded sockets therein at diametrically-opposite points thereon; of a pulley section keyed to the shaft and having a sleeve formed integral therewith, a key formed on the outer periphery of said sleeve, a longitudinally movable pulley section applied to said sleeve and provided on its inner periphery with a key-way to receive the aforesaid key therein, the inner face of said movable pulley section being hollowed to provide a pair of spaced concentric flanges to contact with the inner face of the first mentioned pulley section, the outer face of said movable pulley section being provided with a recess, a washer disposed in said recess, a collar applied to the outer end of the sleeve on said first mentioned pulley section, set screws extending through said collar and sleeve to engage the threaded sockets in the shaft to simultaneously secure the collar on said sleeve and the sleeve on said shaft, and a coil spring encircling said sleeve between said collar and washer on the movable pulley section to normally retain the latter in engagement with the rigid pulley section.

In testimony whereof I hereunto affix my signature in the presence of two witnesses.

JAMES H. McGLYNN.

Witnesses:
GEORGE WM. SCHAPPERT,
EDWARD N. NOLL.